United States Patent
Jue et al.

(10) Patent No.: US 6,284,692 B1
(45) Date of Patent: Sep. 4, 2001

(54) T'-PHASE ZIRCONIAS FOR HIGH TEMPERATURE APPLICATIONS

(75) Inventors: Jan-Fong Jue; Anil Vasudeo Virkar, both of Salt Lake City, UT (US)

(73) Assignee: Materials and Systems Research, Inc., Salt Lake City, UT (US)

( * ) Notice: Subject to any disclaimer, the term of this patent is extended or adjusted under 35 U.S.C. 154(b) by 0 days.

(21) Appl. No.: 09/753,094

(22) Filed: Jan. 2, 2001

Related U.S. Application Data

(62) Division of application No. 09/200,402, filed on Nov. 28, 1998, now Pat. No. 6,168,745.

(51) Int. Cl.$^7$ .................................................. C04B 35/486
(52) U.S. Cl. ........................... 501/103; 219/543; 219/544
(58) Field of Search ............................ 501/103; 219/543, 219/544

(56) References Cited

U.S. PATENT DOCUMENTS

| | | | |
|---|---|---|---|
| 4,344,904 | * | 8/1982 | Yamada et al. ...................... 264/66 |
| 4,771,022 | * | 9/1988 | Block et al. ......................... 501/103 |
| 5,780,178 | * | 7/1998 | Jones .................................... 428/697 |
| 5,939,147 | * | 8/1999 | Jones .................................... 427/453 |
| 6,044,830 | * | 4/2000 | Jones .................................... 501/103 |

OTHER PUBLICATIONS

DeCoursin, et al. Recent Developments of Storage Heaters to Provide Simulation for Air Breathing Propulsion Systems (1983).*

Somiya, et al. "Science and Technology of Zirconia III"Sep., 9–10, 1986, Advances in Cermaics, vol. 24A, pp. 3–14, 465–469.*

* cited by examiner

*Primary Examiner*—Karl Group
(74) *Attorney, Agent, or Firm*—James L. Sonntag

(57) ABSTRACT

A t'-phase zirconia shapes with superior properties are made by forming a zirconia powder containing a rare-earth-oxide dopant into sintered bodies. The sintered bodies are heat treated in an oxygen atmosphere at a temperature high enough to form a cubic phase. The heated body is then cooled rapidly to form a t'-phase. The t'-phase is characterized with a large grain size, is resistant to transformation, low temperature degradation, and has excellent toughness, and creep resistance. Rare earth-oxide dopants include yttria, scandia, erbia, and ceria. For yttria doped materials, the sintered body is doped with between 2.5 and 5 mole percent yttria.

7 Claims, 16 Drawing Sheets

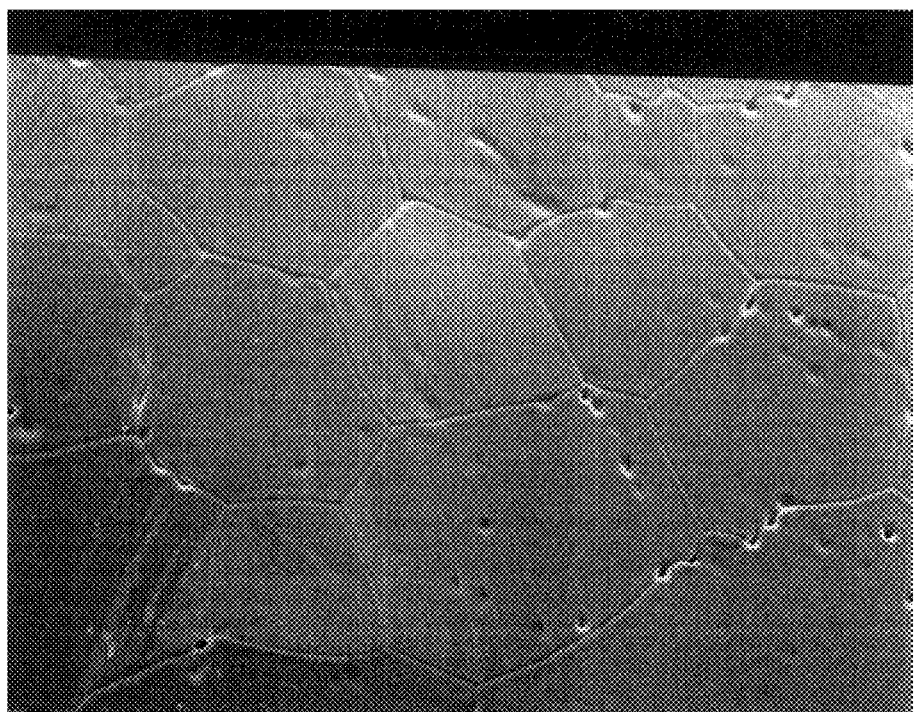
Fig. 6  Prior-art
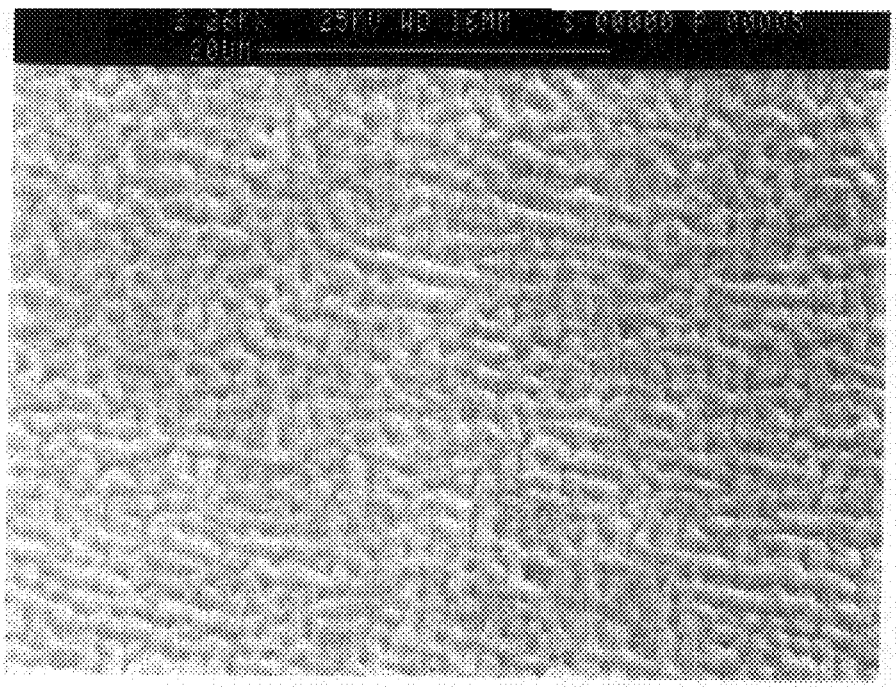
Fig. 7

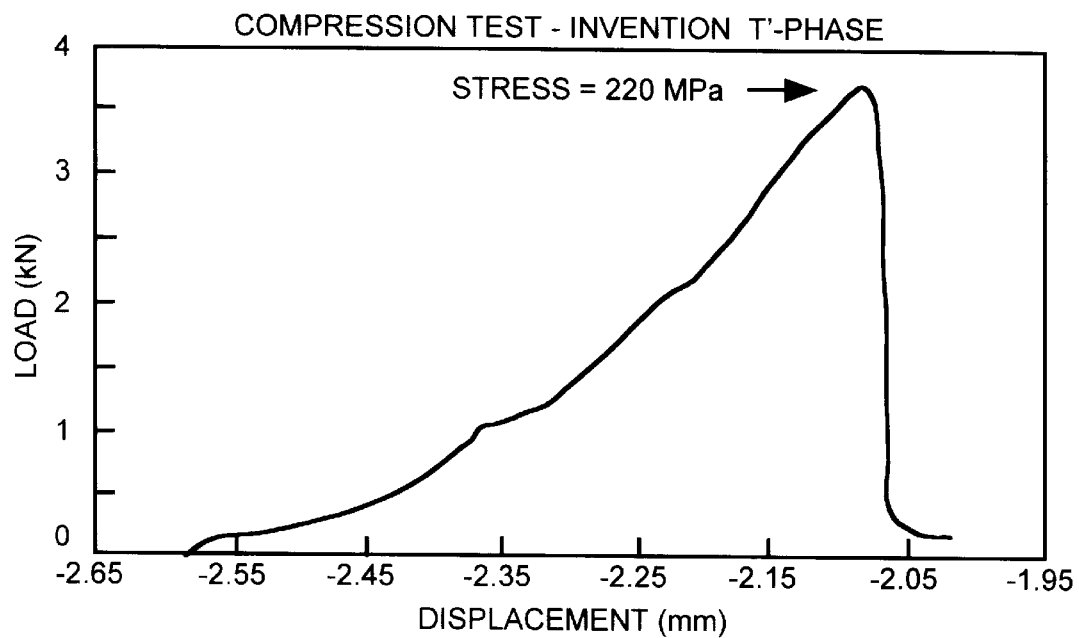
Fig. 8
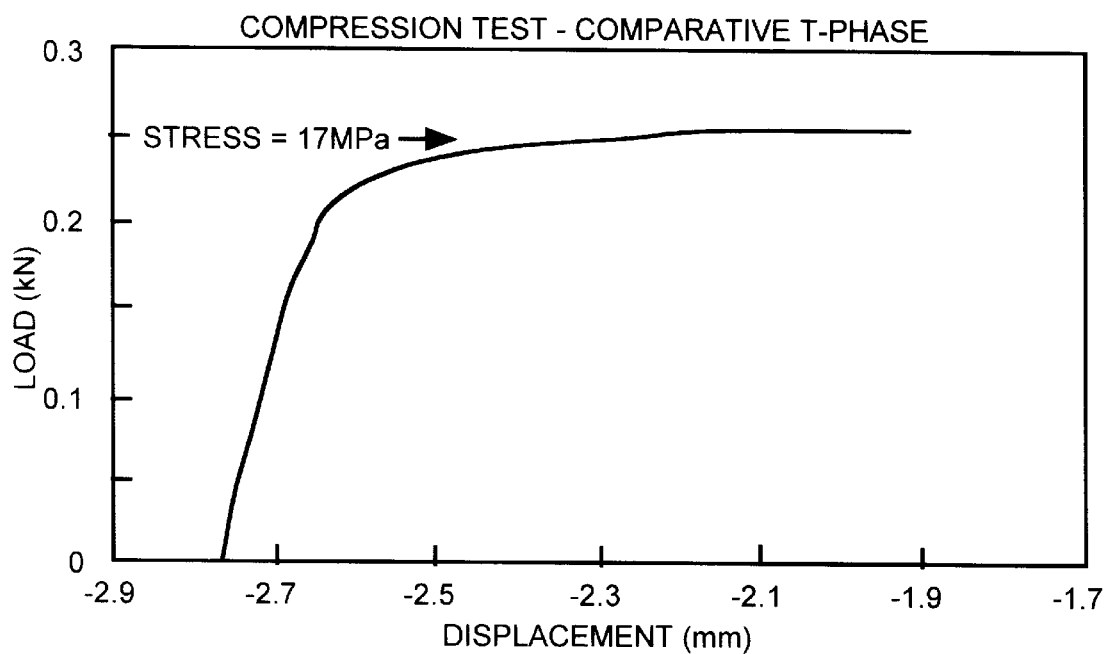
Fig. 9 PRIOR-ART

PRIOR-ART

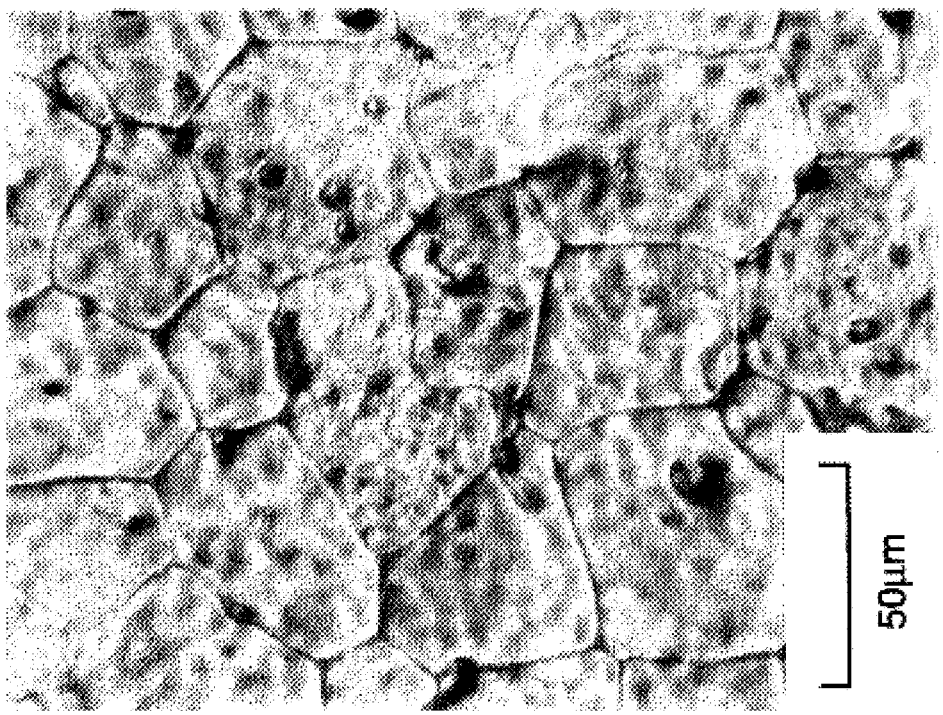
Fig. 12    Prior-art
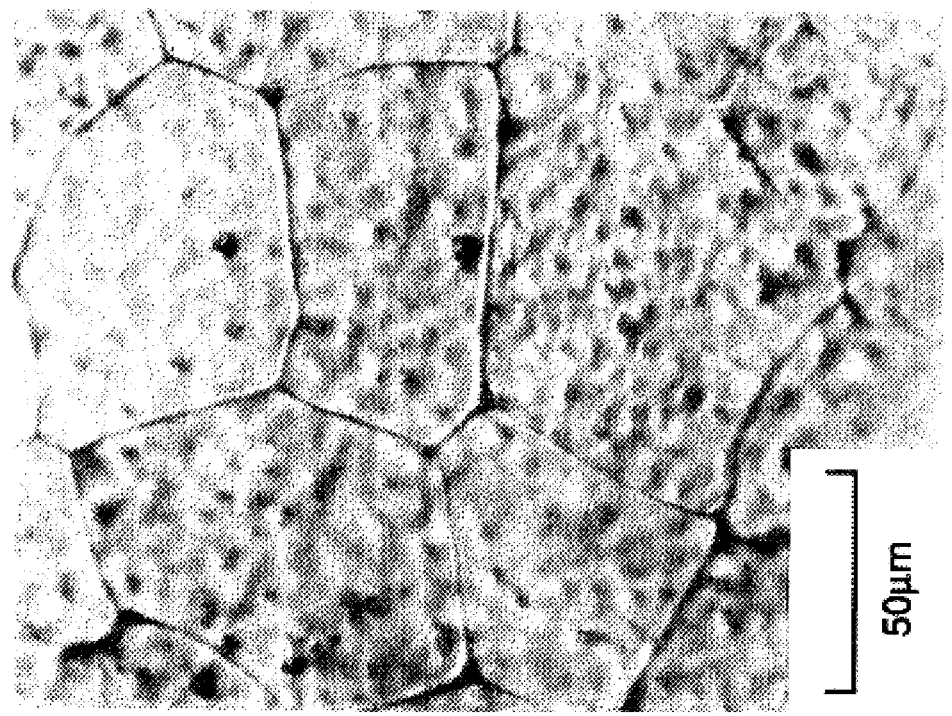
Fig. 13

T'-PHASE ZIRCONIAS FOR HIGH TEMPERATURE APPLICATIONS

RELATED APPLICATIONS

This application is a division of U.S. patent application Ser. No. 09/200,402, filed Nov. 28, 1998, issued as U.S. Pat. No. 6,168,745 issued Jan. 2, 2001.

STATEMENT REGARDING FEDERALLY SPONSORED RESEARCH OR DEVELOPMENT (Not applicable)

FIELD OF THE INVENTION

This invention relates to stabilized zirconia compositions for high-temperature applications, such as high-temperature heating elements.

BACKGROUND OF THE INVENTION

The storage heater is an element in the air supply system of a hypersonic true temperature tunnel. Cored bricks are the most costly item in the heater. Most metallic and ceramic materials cannot survive at the high operation temperature of a storage heater (2200° C.). The requirements for high temperature storage applications are: (1) Excellent phase stability up to 2200° C., (2) High thermal shock resistance parameter (■T>350° C.), (3) Creep deformation <1% under a compressive stress of 10 psi at 1650° C. Currently, 6–8 mol % yttria ($Y_2O_3$) stabilized zirconias ($ZrO_2$) are used for such applications due to their good phase stability at high temperatures. The poor mechanical properties, especially thermal shock resistance, and large amount of yttria required to stabilize zirconia (yttria is ten times more expensive than zirconia) make the cost of operation high. It is well known that fine grained yttria partially stabilized zirconias containing 3 to 4.5 mol % yttria have very good room temperature bending strength (as high as 1 GPa) and moderate toughness (about 6 MPa√m). However, these zirconia materials deform superplastically at temperatures higher than 1300° C. due to their small grain sizes. Creep resistance can be enhanced by increasing the grain size. But increasing the grain size causes destabilization of the tetragonal phase and attendant cracking. Thus, from the standpoint of applications in a storage heater, there are conflicting requirements; large grain size is needed for improved creep resistance; small grain size is needed for preventing spontaneous tetragonal to monoclinic transformation.

Zirconia, which has a melting point of 2700° C., is widely used at elevated temperatures as insulation, thermal barrier coatings, as solid electrolytes (because of its high ionic conductivity) in electrochemical devices and as heating elements (because of its high electronic conductivity, above about 1600° C.). In a pure form, zirconia exhibits three crystallographic polymorphs; cubic (c) above about 2370° C., tetragonal (t) between about 1100° C. and about 2370° C., and monoclinic (m) below about 1100° C. The phase transformation from tetragonal to monoclinic (t→m) is martensitic accompanied by a large (5%) volume increase and a large (10%) shear strain. This transformation is destructive and leads to micro and/or macrocracks which sometimes destroy the ceramic.

Thus, any application of zirconia requires that either the cubic or the tetragonal phase be stabilized at lower temperatures. This is usually achieved by the addition of alkaline earth or rare earth oxides. Smaller dopant concentrations stabilize the tetragonal phase while larger concentrations are required for the stabilization of the cubic phase. The commonly used stabilizers are MgO, CaO, $CeO_2$, and $Y_2O_3$. For ultra-high temperature applications (above about 2000° C.), $Y_2O_3$ is preferred since it has a lower vapor pressure which is important to prevent destabilization that can occur due to evaporative loss of the dopant, such as can occur with $CeO_2$, MgO, and CaO as dopants. Thus, yttria-stabilized zirconia becomes one of the obvious choices for ultra high temperature applications. However, $CeO_2$-doped tetragonal zirconia is known to exhibit excellent mechanical properties, and thus is a potential candidate for many applications.

There are three ways by which the tetragonal phase (t) can form; (1) by direct heating in the tetragonal stability regime, (2) precipitation from the cubic phase, or (3) by a cubic→tetragonal displacive transformation. The first two methods lead to the formation of tetragonal phase, which is commonly referred to as the t-phase. This phase is metastable and at low temperature, and undergoes a stress-induced transformation in the immediate vicinity of a crack tip to the monoclinic phase, which results in enhanced toughness by the well known transformation toughening mechanism. The propensity to transformation depends upon the grain size of the t-phase; the larger the grain size, the greater is the tendency to transformation. For this reason, grain size in t-phase materials must be carefully controlled to prevent spontaneous transformation. This is undesirable since it leads to cracking and usually very poor properties. The critical grain size above which spontaneous transformation occurs depends upon the dopant type and concentration. Typically, the critical grain size is about 1 to 5 μm. The requirement that the grain size be maintained below a few microns restricts the use of t-phase materials to low temperature applications only since these fine-grained materials are superplastic and readily deform under a small stress above about 1200° C.

The so-called t'-phase is formed by a cubic→tetragonal displacive transformation which is known to be a ferroelastic transformation. Crystallographically, the t'-phase is identical with the t-phase. However, its morphology is quite different. The t'-phase grains consist of domains in three mutually orthogonal directions wherein the domain size is on the order of 0.1 μm or less. The extremely fine size of the domains makes the t'-phase highly resistant to martensitic transformation. In t'-phase materials, therefore, it is not the grain size that matters insofar as martensitic transformation is concerned, but the critical parameter is the domain size. Since the cubic phase is stable at elevated temperatures, the formation of the t'-phase requires that the temperature be raised high enough, into the stability regime of the cubic phase. For samples containing about 3% $Y_2O_3$ or about 12% $CeO_2$, this temperature is about 2000° C. At such a high temperature, grain growth readily occurs leading to a grain size in excess of 100 μm. Despite such a large grain size, these materials are resistant to the formation of monoclinic phase due to the fine domain size. Additionally, despite such a large grain size, these materials also exhibit a relatively high strength (about 400 MPa). At the same time, high temperature creep resistance is also excellent due to the large grain size. The t'-phase materials thus have a unique combination of the following properties: (1) Excellent resistance to destructive martensitic transformation which is common in large-grained t-phase materials, (2) Excellent toughness, (3) Good strength, and (4) Excellent creep resistance unlike t-phase materials.

Because of it properties, the t'-phase materials would seem to be ideally suited for elevated temperature applications such as heating elements, and the like. However, t'-phase systems have been very difficult to manufacture in form that is suitable for applications. Most of the literature reported on the t'-phase is either on arc-melted samples or in samples containing over 6 mol % yttria. The arc-melted materials can only be used for microstructural characterization, which are not in a useful form for applications. The properties of the latter, high yttria content materials are not attractive. They contain t'-phase with too small of a tetragonality, and have properties not much better than the cubic phase. The principal limitation in manufacturing a t'-phase zirconia with low dopant content has been the high fabrication temperatures required. Because of the limitations in manufacturing, the only use to date of t-phase zirconias has been for use in thermal barrier coatings. The principal limitation is the high fabrication temperatures required.

Currently heating elements are made of CaO- or $Y_2O_3$- stabilized zirconia with cubic as the predominant phase. These elements have many shortcomings: (1) Low phase stability due to the high pressure of the stabilizer in CaO-stabilized materials; (2) Poor mechanical properties due to the presence of cubic phase; (3) Poor thermal shock resistance which restricts applications to very slow heating rates (<25° C./hr). (4) High cost (as high as $1,000 per element).

Objects of the Invention

It is, therefore, an object of the invention to provide a process for the manufacture of t'-phase zirconia with properties and in a form suitable for applications.

Another object of the invention is to provide a process for manufacturing materials in the zirconia-based systems which exhibit a very large grain size and yet do not undergo destabilization.

Another object of the invention is to provide a process for manufacture of zirconia compositions suitable for high-temp which are suitable for high-temperature applications which have superior thermal shock properties allowing high rates of thermal cycling.

Another object of the invention is to provide a process for manufacture of zirconia compositions suitable for high-temp which are suitable for high-temperature applications which are less expensive than prior-art zirconias.

Another object of the invention is to provide a process for manufacture of zirconia compositions suitable for high-temp which are suitable for high-temperature applications which have superior mechanical properties due the absence of cubic-phase zirconia.

Another object of the invention is to provide a process for manufacture of zirconia compositions suitable for high-temp which are suitable for high-temperature applications which have good phase stability.

Another object of the invention is to provide a process of manufacturing materials are suited for application as heating elements, such as in storage heaters.

Further objects of the invention will become evident in the description below.

BRIEF SUMMARY OF THE INVENTION

The present invention is a method for the fabrication of polycrystalline t'-phase zirconia ceramics for ultra-high temperature applications (exceeding 2000° C.). The preferred application for practice of the present invention is for heating elements in high temperature furnaces. Polycrystalline t'-phase zirconia ceramics are manufactured that exhibit high toughness, excellent thermal shock resistance, excellent creep resistance, and moderately high strength. These materials are superior to the conventional t-phase or cubic phase zirconia for high temperature applications.

Zirconia powder containing a suitable amount of yttria is green-pressed into the shape appropriate for the application, e.g. cored bricks. If the yttria content is too low, the phase stability is too low, and high treatment temperatures are required. If the yttria content is too high, the mechanical properties are poor, and the raw material cost is high, since yttria is expensive. Zirconia powders containing 2.5 to 5% yttria are believed to be suitable. The green body is then fired. While the theoretical density is not critical, firing temperatures and times are preferably set to sinter the body to a theoretical density of greater than about 99%. A temperature between 1450° C. and 1700° C. for a time between 1 and 6 hours is suitable. The sintered bricks typically achieve 99.5% of theoretical density.

These sintered bricks are heat-treated in an oxidizing environment, e.g. an oxygen-containing gas such as air, at a temperature near about 2000° C., i.e., between about 1900° C. and about 2200° C., and held at that elevated temperature to form a high temperature cubic phase. A suitable holding time at these high temperatures is from about 15 minutes to about one hour.

Then the bricks are then quenched to form the t'-phase. Suitable quenching conditions are cooling the bricks rapidly to 1400° C. at a cooling rate of more than 100° C./minute to form the t'-phase with minimal decomposition products. If temperatures are maintained at about 1400° C. for a period greater than about an hour, excessive decomposition products are formed. Then the bricks are furnace-cooled to room temperature.

The result is a t'-phase material with a large grain size and small domain size. The phase is essentially pure t'-phase with no monoclinic phase present. This material has suitable mechanical strength and toughness for applications, being two to three times stronger and tougher than the 8 mol % yttria stabilized zirconia currently used for heater applications. It is also cheaper due to lower yttria content.

Potential commercial applications of polycrystalline t'-phase zirconia include: (1) Heating elements for furnaces, (2) Refractories, (3) Kiln furniture, (4) Liners for chemical reactors wherein resistance to attack by water, acids, alkalis at elevated temperatures is a must, (5) Storage heaters, (6) Substrates for superconductors, and (7) Structural components requiring a high creep resistance. Polycrystalline t'-phase zirconia bodies can be formed into essentially any desired shape, i.e., any shape in which the rare-earth-oxide doped zirconia powder can be formed. Accordingly, the present invention is particularly adaptable to the formation of complex shapes like cored storage heaters, or custom structural elements.

High toughness, resistance to low temperature martensitic transformation, resistance to low temperature (100 to 400° C.) aging, moderately high strength, and excellent creep resistance makes the t'-phase superior to the conventional t-phase materials in many applications. Particularly, the t'-phase material manufactured according to the invention is ideally suited for application as heating elements. Other applications of t'-phase zirconia according to the invention include liners for chemical reactors which are exposed to high temperatures and corrosive environments. In such applications, the conventional t-phase materials are unsuitable due to their tendency to degradation by low temperature, moisture-assisted aging. Finally, the t'-phase is also ideally suited for applications such as oxygen sensors. High toughness, good thermal shock resistance, and resistance to aging in moisture-containing atmospheres make these materials excellent candidates for sensor applications wherein rapid changes in temperature are expected during service. By practice of the present invention, the limitations of manufacturing that were encountered in the prior-art have been overcome, making the manufacture of t-phase materials for these applications practical and economical.

BRIEF DESCRIPTION OF THE DRAWINGS

FIG. 6 is an SEM micrograph of a comparative 8 mol % yttria-doped zirconia.

FIG. 7 is an SEM micrograph of a 12 mol % ceria doped zirconia manufactured according to the invention.

FIG. 8 is a load-displacement curve at 1400° C. of a 3 mol % yttria doped t'-phase zirconia manufactured according to the invention.

FIG. 9 is a load-displacement curve at 1400° C. of a comparative 3 mol % yttria doped t-phase zirconia.

FIG. 12 is an optical micrograph of the surface of the zirconia tube as in FIG. 11.

FIG. 13 is an optical micrograph of the surface of the zirconia tube as in FIG. 11 after direct resistive heating to form t-phase.

DETAILED DESCRIPTION OF THE INVENTION $Y_2O_3$-$ZrO_2$ System

Figure 1:
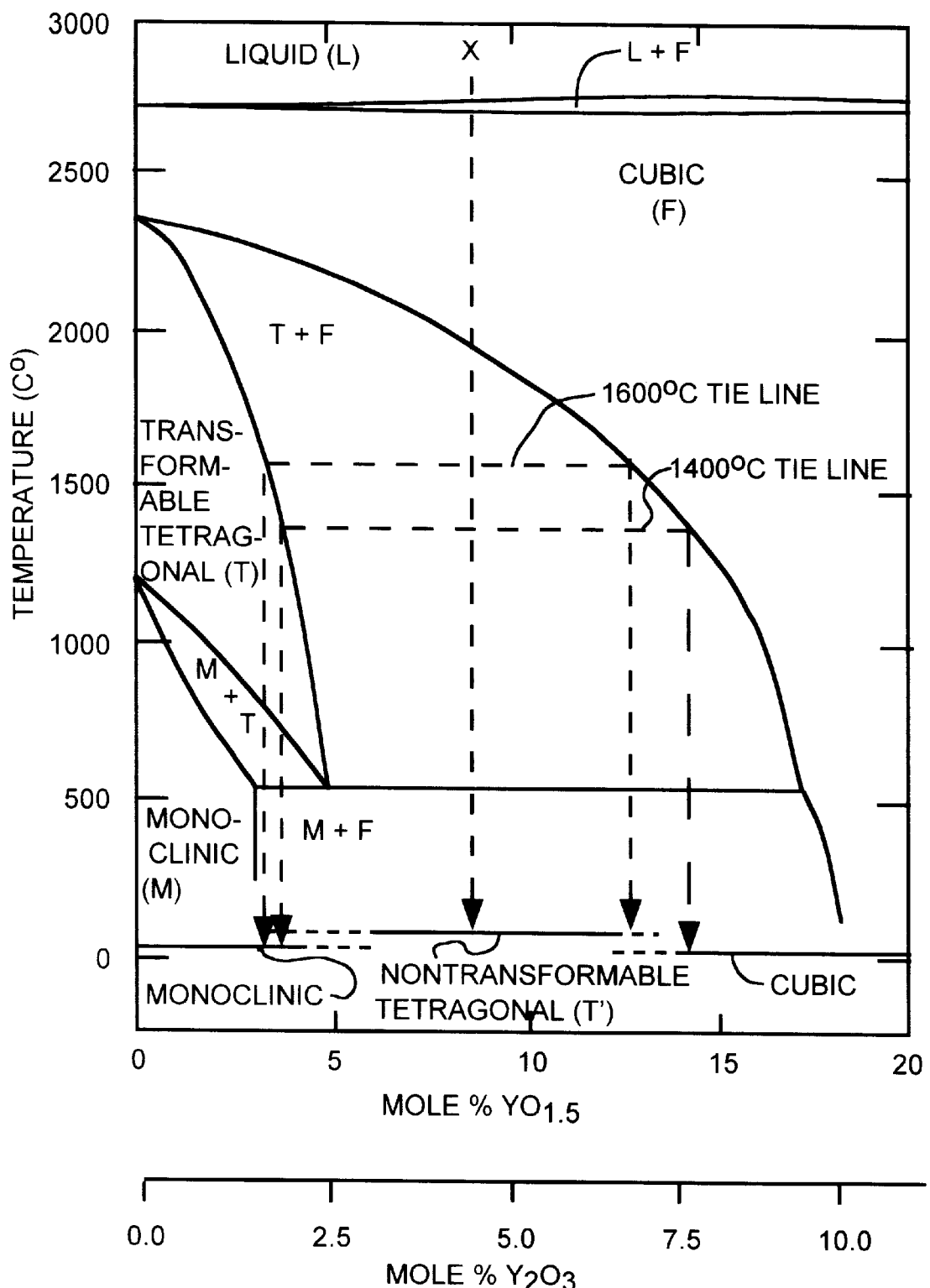
FIG. 1 is a phase diagram of the yttria/zirconia system.

The yttria ($Y_2O_3$)/zirconia ($ZrO_2$) phase diagram is shown in FIG. 1. The diagrams shows particularly composition-temperature conditions under which the t'-phase can be formed by heat treatment and subsequent quenching. For instance, 4.0 mol % $Y_2O_3$-doped zirconia exists as a cubic phase above about 1950° C. and when quenched fast enough through the two phase (tetragonal plus cubic) field forms the t'-phase at lower temperatures (line x).

For zirconia compositions with greater than about 6 mol % $Y_2O_3$, the cubic phase is stable above 1650° C. and thus the cubic→tetragonal displacive transformation can be effected at a relatively low temperature. However, upon quenching, these materials contain t'-phase with too small a tetragonality and with properties not much better than the cubic phase. Thus, too high a concentration of $Y_2O_3$ is undesirable.

For zirconias with less than about 1.5 mol % $Y_2O_3$, the cubic phase field exists at temperatures higher than 2300° C. This not only requires very high heat treatment temperatures, but that transformation to the monoclinic phase often cannot be suppressed. The preferred composition range is accordingly between about 2.5 mol % and 5 mol % $Y_2O_3$ for manufacturing t'-phase materials for elevated temperature applications.

Characterization of t'-phase zirconias manufactured according to the invention have has shown the grain size of these materials to be on the order of 50 to 100 μm. The t'-phase materials are resistant to transformation, resistant to low temperature degradation, exhibit excellent toughness (>~8 MPa√m for yttria-t'), and excellent resistance to creep deformation at temperatures at least as high as 1400° C. Excellent stability (resistance to martensitic transformation) of these materials is due to the existence of three tetragonal variants (domains) within each grain. Excellent creep resistance is due to the large grain size. Excellent resistance to low temperature degradation is due to the small variant (domain) size, which is ≦0.1 μm. Flexural strength at room temperature is about 400 MPa for 3 mol % yttria-doped t'-phase zirconia, this despite a grain size in excess of 100 μm. For many applications, the desired microstructure consists of a relatively fine (10 to 20 μm) grain size near the surface for high strength and relatively coarse (50 to 100 μm) in the interior for a greater creep resistance. Such a microstructure is fabricated, as further described below, with resistive heating where the work piece is heated by passing an electrical current through it.

Yttria can be replaced by other rare earth oxides or other suitable dopants, such as scandia ($Sc_2O_3$), erbia ($Er_2O_3$) or ceria ($CeO_2$) to form t'-phase zirconia with similar properties. For example, ceria-doped tetragonal zirconia (CeTZP) ceramics can also be manufactured by the method of the invention. These materials usually contain 12 mol % $CeO_2$, are fully tetragonal, and are fabricated by sintering at 1500 to 1600° C. $Y_2O_3$-doped materials are generally preferred over CeTZP materials because yttria-doped materials have better high temperature stability due to lower vapor pressure of $Y_2O_3$, as compared to $CeO_2$.

EXAMPLES

Experimental Procedure

Fabrication of zirconia Bars and Tubes

For the fabrication of t'-phase materials, the compositions selected were 3 and 4.5 mol % $Y_2O_3$-doped zirconia. The reasons for choosing these compositions were: (1) These materials exhibit exceptional strength, toughness, and thermal shock resistance. (2) These compositions of zirconia are highly resistant to the tetragonal to monoclinic phase transformation, and can be transformed to the t'-phase if heat treated above 2000° C. (3) Highly active and sinterable powders of these compositions are commercially available.

Bar samples (1 cm×0.6 cm×4 cm after sintering) of 3, 4.5, and 8 mol % yttria-stabilized zirconia compositions were made from commercially available materials, i.e., HSY-3.0 (containing 3 mol % yttria), HSY-4.5 (containing 4.5 mol % yttria), and HSY-8.0 (containing 8 mol % yttria) coprecipitated starting powders. (HSY is a trademark of American Sales Inc.). Fabrication of HSY-3.0, HSY-4.5, and HSY-8.0 based samples involved die-pressing (4000 psi) using a steel die, cold isostatic pressing (30,000 psi), and sintering in air at 1450° C. for 4 hours. The 8 mol % yttria-doped cubic phase samples were made as a base line material to compare its physical properties with the 3 and 4.5 mol % yttria-doped t'-phase materials. Selected samples of 12 mol % $CeO_2$ doped zirconia were also made by a similar process except that the sintering temperature was 1500° C.

Tubes of length about 15 cm and diameter 1.5 cm (wall thickness 1 mm) were green-formed by isostatic pressing commercial zirconia powder compacts in a rubber mold containing a steel tube and a mandrel at 200 MPa. Subsequently, the tubes were sintered in air over a range of temperatures between 1450 and 1600° C. for 2 hours. This procedure is known to yield fine grained (about 2 $\mu$m) tetragonal zirconia materials of a near theoretical density, high strength, and high toughness.

Some zirconia tubes containing 4.5 mol % yttria were custom fabricated to specifications by a commercial vendor. The dimensions of these tubes were 60 cm in length, 1 cm in diameter, 1.5 mm in wall thickness. These tubes were sintered at 1720° C. for three days and grain sizes as large as 20 $\mu$m were obtained. Both types of tubes were used as heating elements to prove the concept of direct resistive heat treatment.

Thermal Treatment

Sintered tetragonal or cubic zirconia bars and tubes with yttria or ceria dopant were heat treated using two different methods:

(a) Direct Resistive Heating

Tubes were inserted into the two zirconia holders (either porous or dense CaO-stabilized zirconia). Zirconia cement was used to ensure a good contact between the holder and the tube. This contact is important to prevent arcing. If arcing occurs, it can cause local hot spots with temperatures high enough to melt zirconia, which is clearly undesirable. Two types of electrodes were attached to the element grips on the outsides of the zirconia holders. The first electrode material was Sr-doped $LaCrO_3$ holders which were slipped over the zirconia grips. Zirconia cement was used to ensure a good electrical contact between the zirconia holders and Sr-doped $LaCrO_3$ electrodes. All cemented sections were heated to 1400° C. for 1 hour to ensure a good contact. Instead of Sr-doped $LaCrO_3$, some tubes were painted with a platinum paste, dried overnight and then fired at 1000° C. for one hour in order to bond the platinum electrodes. The purpose of using different electrode materials was to examine the performance difference between the elements with Pt electrodes and LSC electrodes. When testing the elements, the furnace was electrically heated by supplying power to the four $MoSi_2$ heating elements. The temperature of the furnace was monitored with a thermocouple while the heating element was monitored by an infrared pyrometer. The furnace was heated slowly (400° C./hour) to 1450° C., and allowed to stabilize. Once the temperature of the element tube reached 1450° C., current was passed directly through the element using an A. C. power supply of standard frequency (60 Hz) and a power rating of 1.4 kW. The magnitude of the current depended upon the resistance of the assembly. Typically the element was heated to above 1800° C. in less than 15 minutes. The surface temperature is expected to be lower than the inner temperature due to thermal losses from the surface. Thus, when the surface temperature was about 1800° C., the interior temperature must be greater than 1800° C. This ensured that the entire element (with the exception of a small portion near the joint between the electrode and the zirconia holder) reached the cubic phase temperature region. As soon as the surface temperature reached a temperature above 1800° C. (in some runs more than 1900° C.), power to the tubes was reduced. In the present work, the furnace had only one zirconia heating element. With six to eight elements, temperature well in excess of 2000° C. is expected.

After the thermal treatment, power to the furnace was decreased to zero (initial cooling rate. greater than 1500° C./hr) and cooling continued to room temperature at a rate of 400° C./hour. After heat treatment, the zirconia element tube was removed from the zirconia holders and electrode assembly using a diamond saw. Each tube was then machined and characterized as described below.

(b) Heat Treatment Using a 2000° C. Furnace

Presintered, bar-shaped samples were loaded into a bottom loading electrically fired furnace. This furnace is heated by commercial CaO-stabilized zirconia elements. Therefore, the heating rate was limited to 20° C./hour between 1450° C. and 1650° C. and 15° C./hour between 1650° C. to 2000° C., which corresponded to more than two days of heating in order to reach 2000° C. This very low heating rate is necessitated by the low thermal shock resistance of CaO-stabilized zirconia elements used in the furnace. After holding at 2000° C. for 10 minutes, the platform containing the yttria-stabilized samples was gradually lowered from the hot zone to ambient air at a cooling rate of 1000° C./minute. It should be noted that, unlike the CaO-stabilized zirconia heating elements, the heat-treated yttria-stabilized zirconia samples can be cooled at a rate 60 times faster without thermal stress cracking. The samples after heat treatment were machined and characterized. Some of the heat treated samples were further annealed in a furnace at 1600° C. for 50 hours. The purpose of the annealing was to determine the effect of long term holding at high temperature on the mechanical properties of the t'-phase materials. Some $CeO_2$-doped samples were also heat-treated in a similar manner.

Phase Content and Density

Densities of the sintered zirconia materials were obtained using the Archemedis immersion method. The phase content of all zirconia materials was examined by XRD (CuK radiation at 30 kV at 35 mA) on polished surfaces of as-sintered as well as heat-treated samples. The purpose of the phase content characterization was to ensure that the heat-treated samples contained no monoclinic phase. It is the transformation to the monoclinic phase which can degrade the mechanical properties of zirconia and also make it susceptible to moisture-assisted low temperature aging.

Microstructure

Samples of 3, 4.5 and 8 mol % yttria-stabilized and 12 mol % $CeO_2$-stabilized zirconia, before and after high temperature treatment, were polished to a 1 $\mu$m surface finish and thermally etched at 1400° for 1 hr prior to optical microscopy (OM) and scanning electron microscopy (SEM). Heat treated 3 and 4.5 mol % yttria-doped and 12 mol % $CeO_2$-doped zirconia specimens were converted to t'-phase zirconia. In order to observe the characteristic domain structure of the t'-phase materials, selected samples were prepared for transmission optical microscopy (TOM). Some t'-phase samples after heat treatment were thinned down to less than 100 $\mu$m thickness using diamond grinding discs and drilled into discs (3 mm in diameter) using a diamond core drill. These discs were dimple ground down to less than 30 μm using diamond pastes. Transmission optical micrographs using polarized light were taken in order to reveal the domain structure within the large grains.

LSC Electrode Fabrication

Figure 2:
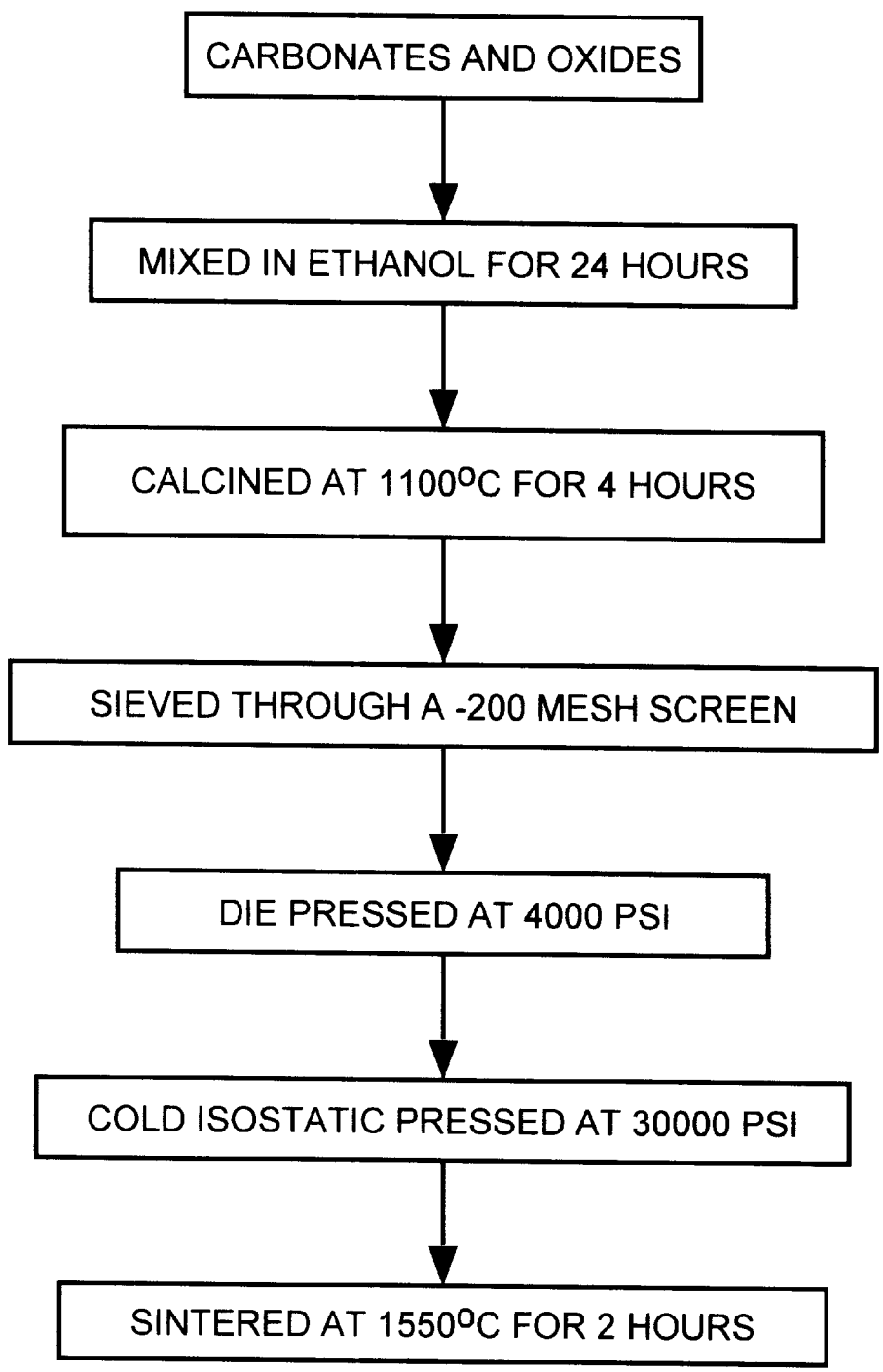
FIG. 2 is a flow chart for the manufacture of the lanthanum strontium chromate electrodes used in the examples.

Sr-doped LaCrO3 is known to be an excellent electronic conductor. It is also compatible with zirconia at relatively high temperatures. This compatibility is both chemical and physical (matching coefficients of thermal expansion). Sr-doped $LaCrO_3$ has been used as an electrode material for CaO-stabilized zirconia elements manufactured in China. Sr-doped LaCrO3 is also used as an interconnect material in high temperature solid oxide fuel cells. In $LaSr_xCr_{(1-x)}O_{(3-)}$, a value of x as high as 0.2 has shown good results, both from the standpoint of conductivity (which is p-type) and thermal expansion compatibility with zirconia. A value of x=0.15 was chosen based on prior experience. Powder mixtures of $La_2(CO_3)_3$, $Cr_2O_3$ and $SrCO_3$ were weighed in the desired proportions to yield a composition corresponding to X=0.15. The powder mixtures were ball-milled, calcined, and milled again. Tubes were isostatically-pressed (30,000 psi) using the calcined and milled powder. Sintering was conducted at 1550° C. for 4 hours. A flow chart for this process is shown FIG. 2.

Mechanical Testing

Sintered, bar-shaped, yttria-doped zirconia samples containing 3, 4.5, or 8 mol % $Y_2O_3$, and 12 mol % $CeO_2$-doped zirconia samples, before and after high temperature heat treatment, were surface ground using a diamond grinding wheel, followed by hand grinding and polishing using diamond grinding discs and pastes. One surface of each sample was polished to a 1 μm finish. These samples were used to characterize mechanical properties.

A few bars, after direct resistive heating and fast cooling (cooling rate higher than 1500° C./hr) were tested in four point bending at room temperature. The purpose of this test was to determine the effect of the direct resistive heating and fast cooling on the mechanical strength of 4.5 mol % yttria stabilized zirconia.

Rectangular shaped 3 and 8 mol % yttria-stabilized zirconia samples (before and after high temperature treatment) of dimensions 4 mm×4 mm×9 mm were subjected to a uniaxial compressive loading using SiC platens at a temperature of 1400° C. in an Instron™ machine.

Some of the t'-phase samples were heat-treated at 1600° C. for several hours. The high temperature compressive strength of the t'-phase samples after 1600° C. annealing was determined. The purpose of these tests was to determine the effect of phase separation on the high temperature properties of the t'-phase.

Thermal Shock Resistance Tests

Thermal shock resistance tests were conducted on polished bend-bar samples of 3, 4.5 and 8 mol % yttria-doped zirconia materials. This was evaluated in terms of the retained bending fracture strength of samples that were first held in a furnace at 1400° C. and, subsequently, quenched to room temperature under a jet of ambient air. Following this treatment, the thermal-shocked bar samples were examined for any visual cracks. Irrespective of whether the samples had cracked after the test, they were tested in a four-point bending apparatus to assess the retained flexural strength.

Evaluation of the Performance of t'-Phase Heating Elements

Figure 3:
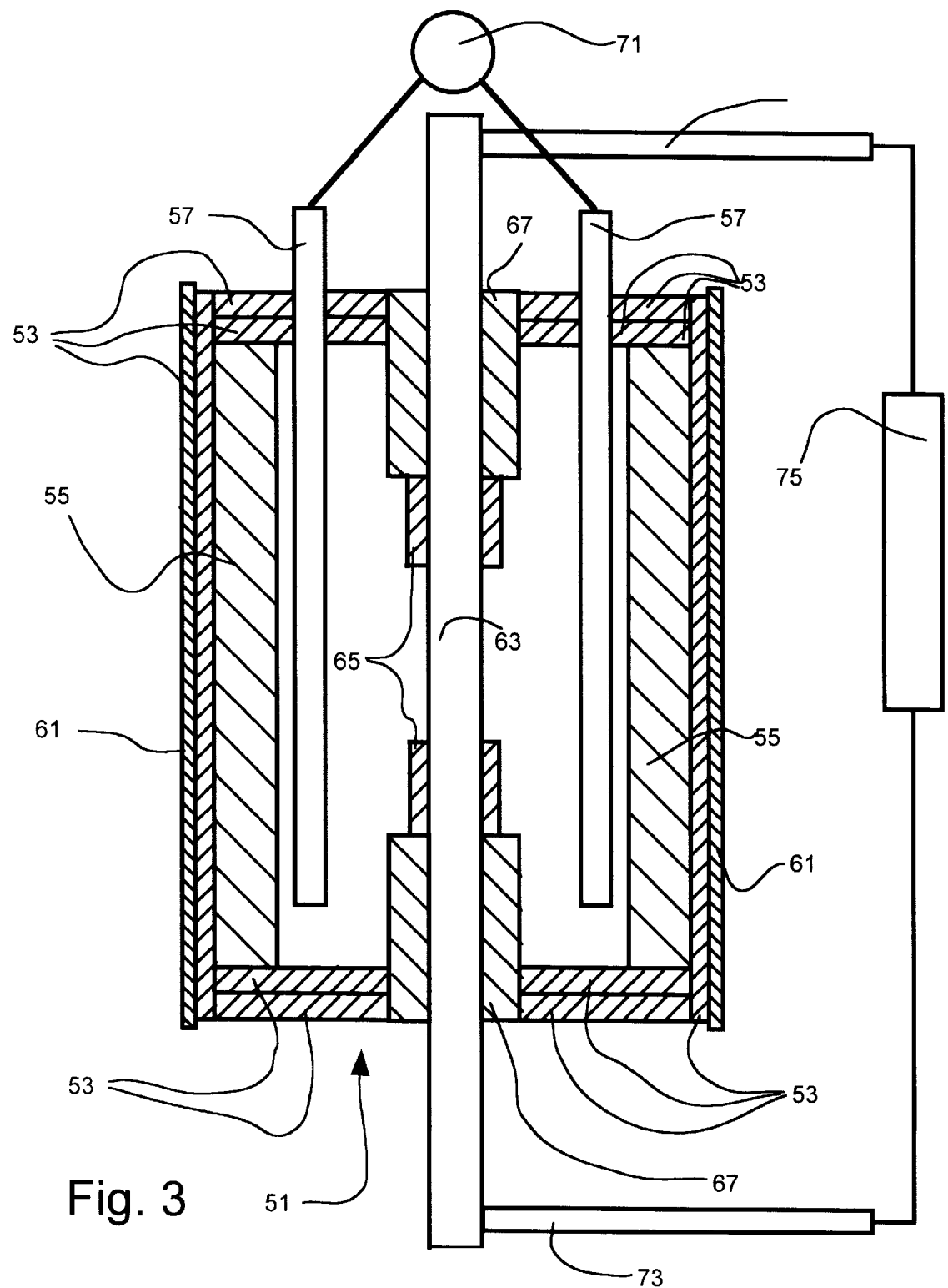
FIG. 3 is a schematic cross-sectional view of a furnace rapid cooling furnace used to test compositions made in the Examples.

One of the promising applications for the t'-materials is in high temperature heating elements. The commercially available zirconia heating elements (cubic phase) have to be heated very slowly (less than 25° C./hr) due to their low thermal shock resistance. By contrast, t'-phase heating elements made according to the invention are expected to withstand considerably faster heating and cooling rates. A furnace was designed for heating element testing which can accommodate a much higher cooling rate (400° C./hr). The furnace 51, shown schematically in cross-section in FIG. 3, comprises a steel shell 61, porous alumina insulation 53, dense zirconia insulation 55, and molybdenum disilicide heating elements 57. The t'-phase heating element 63 is held in place by two zirconia rings 65 and MgO cups 67. The molybdenum disilicide heating elements are heated using a power supply 71. Power is supplied to the t-phase heating element 63 suitable power busses 73 connected to a suitable transformer 75.

Results and Discussion

I. Microstructure and Phase Content of t and t'-Phase Zirconias

The density of the as-sintered 3 mol % yttria-stabilized zirconia (HSY-3.0) was measured to be 6.07 g/ml. The reported value of a single crystal of 3 mol % yttria-stabilized tetragonal single crystal is 6.11 gm/ml. At a first glance, it would appear that the slightly lower density of the polycrystalline samples may be due to some porosity. However, the microstructure appeared to be fully dense. A possible reason for the slightly lower density as compared to the theoretical value is that according to the phase diagram given in FIG. 1, at the sintering temperature of 1450° C., the 3 mol % $Y_2O_3$ composition corresponds to a two phase field of cubic and tetragonal phases. According to the phase diagram, the as-sintered samples should contain about 15% of cubic phase (which has density 5.96 g/cc). The densities of 4.5 and 8 mol % yttria-stabilized zirconias were measured to be 6.06 and 5.96, respectively. All compositions appeared fully dense from microstructures. Phase content analysis using X-ray diffraction revealed that all 3 mol % yttria-doped zirconia (HSY-3.0), 4.5 mol % yttria-doped zirconia (HSY-4.5), and 8 mol % yttria-doped zirconia (HSY-8.0) as-sintered materials contained no monoclinic phase. With the exception of 8 mol % yttria-doped samples, all other samples contained both cubic and tetragonal phases. The 8 mol % yttria-doped material contained only the cubic phase while 12 mol % $CeO_2$-doped zirconia was fully tetragonal. These results are consistent with the existing phase diagrams.

Figure 4:
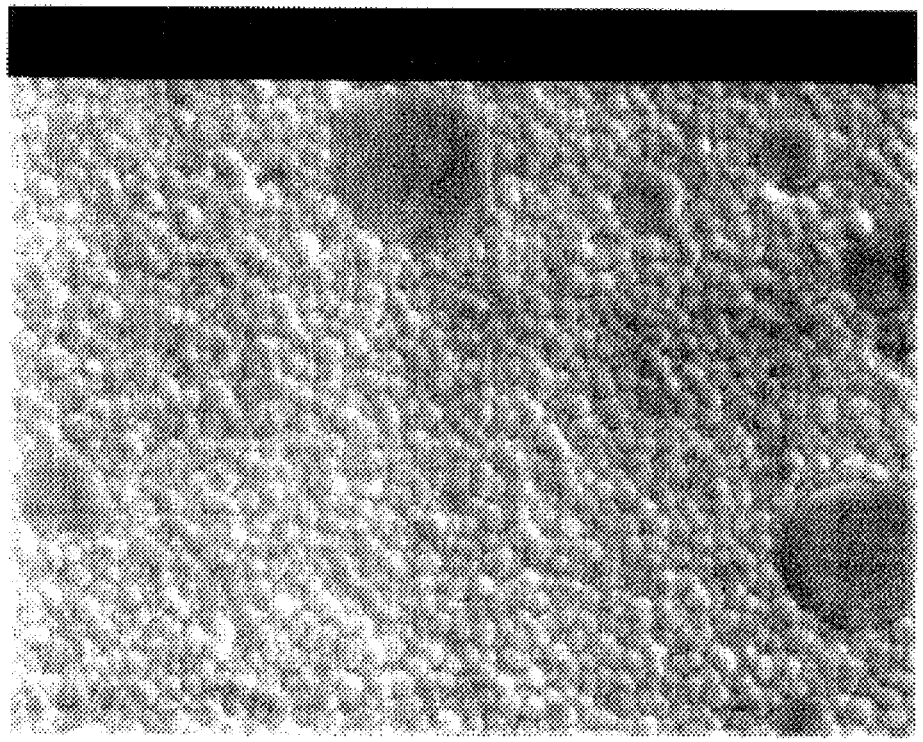
FIG. 4 is an SEM micrograph of an unfired sample of sintered 3 mol % yttria-doped zirconia.

FIG. 4 shows a scanning-electron-microscope (SEM) micrograph of an as-sintered 3 mol % yttria-doped zirconia sample sintered at 1450° C. The microstructure is seen to be duplex with relatively coarse grains (3 to 4 μm) in a fine-grained (<0.5 μm) matrix. The larger grains were identified to be of the cubic phase while the smaller grains are of the tetragonal polymorph (t-phase). The volume fraction of the coarse grains is about 15%. It is also seen that in the 4.5 mol % yttria-doped samples, the amount of the cubic phase is greater, as expected. That is, the amount of the cubic phase increases with the yttria content. Samples with 8 mol % yttria content are fully cubic with a grain size on the order of about 5 μm after sintering at 1450° C.

XRD traces of samples after 2000° C. heat treatment (t'-phase) revealed no monoclinic phase despite their large grain sizes (about 120 Pm for 3 mol % yttria stabilized zirconias). Also, the trace was consistent with a single phase tetragonal polymorph. The excellent phase stability of the 3 mol % t'-phase materials has been attributed to the fine ferroelastic domains (variants) within the large t'-phase grains.

Figure 5A:
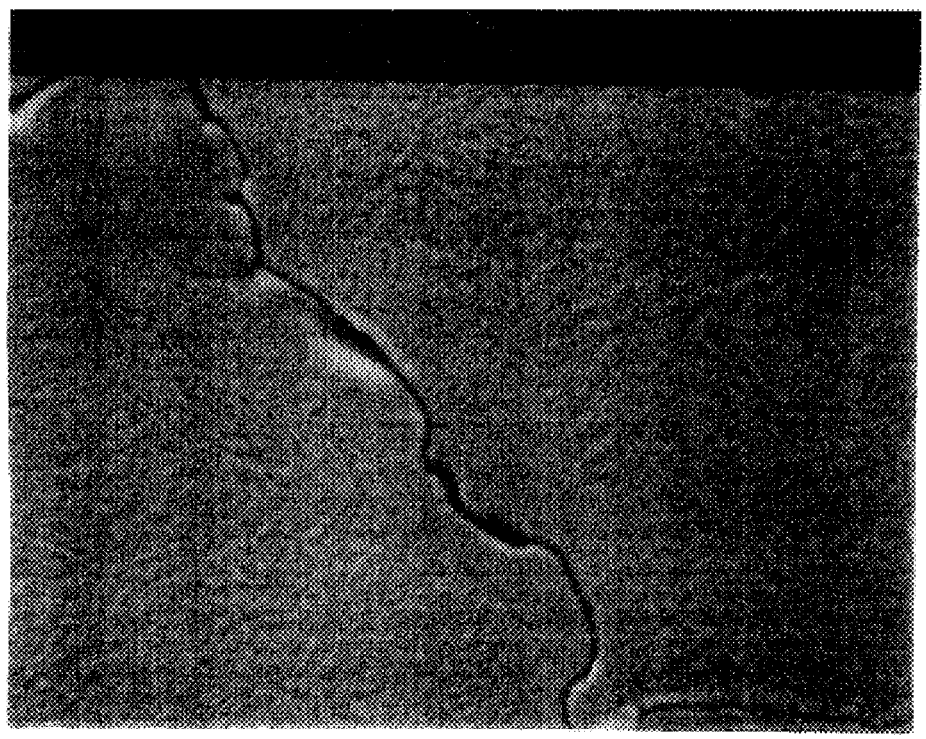
FIG. 5a is an SEM micrograph of a 3 mol % yttria-doped zirconia manufactured according to the method of the invention.

FIG. 5(a) is an SEM micrograph of a sample of 3 mol % yttria-doped t'-phase sample (after 2000° C. heat treatment). The micrograph show a grain boundary separating two grains. As evident in the micrograph, the grain size is very large, on the order of about 12 μm (measured separately). Of particular interest in the faint substructure seen in the micrograph, which is the manifestation of domain structure characteristic of t'-phase material discussed earlier.

Figure 5B:
FIG. 5b is a TOM micrograph of a 3 mol % yttria-doped zirconia manufactured according to the method of the invention.

The domain structure is better resolved by transmission optical microscopy (TOM) under cross-polarized light. Transmission optical micrographs using cross-polarized light were taken in order to reveal the domain structure within the large grains. FIG. 5(b) is a transmission optical micrograph of a 3 mol % $Y_2O_3$-doped t'-phase material fabricated by annealing at 200° C. for 15 minutes. The fine domain structure within large grains can be easily seen in FIG. 5(b). Each fine rectangular area in the large grains corresponds to a "colony" of ferroelastic domains. Each colony comprises of hundreds of finer ferroelastic domains which cannot be revealed by the optical microscope. The actual ferroelastic domain has a typical size of about 0.5 μm in length and less than about 0.1 μm, as has been revealed in an earlier work using transmission electron microscopy (TEM).

Figure 5C:
FIG. 5c is a TEM micrograph of a 3 mol % yttria-doped zirconia manufactured according to the method of the invention.

FIG. 5(c) shows a bright field TEM image of the same sample. Herringbone-like features are domains. The marker is 0.5 μm in length. Note that the individual domains are less than 0.1 μ in width. It is this very fine size of the domain which is responsible for the high stability of these materials despite the large grain size. No such fine structures were observed under both TOM and TEM in 8 mol % yttria-doped zirconia samples subjected to the same treatment.

It should be recalled that scanning electron microscopy also reveals the domain structure of the t'-phase sample. For the purpose of comparison, the SEM micrograph of an 8 mol % yttria-doped material is given in FIG. 6, which shows the absence of domain structure.

FIG. 7 show an optical micrograph of a sample containing 12 mol % $CeO_2$ that was heat treated at 2000° C. for 15 minutes after the initial sintering step at 1550° C. The fine features within the grain are domains. Note that the grain size of the heat-treated sample is considerably greater than a typical t-phase material. It was observed that this material also exhibits excellent resistance to transformation although some monoclinic phase as observed on fracture surfaces. Although much less than fine-grained CeTZP materials. TEM and TOM have shown that ceria-t'-phase materials also contain a fine domain structure within each grain. This further demonstrates that excellent properties of t'-phase materials are the result of the fine domain structure, characteristic of t'-phase materials.

High Temperature Deformation Study

Since the main application of t'-phase zirconia made according to the invention will be at high temperatures, mechanical properties at elevated temperatures are important. Of particular interest is the resistance to creep. For the intended application, it is necessary that the resistance to creep be as high as possible. In order to assess the resistance to creep of t'-phase materials and compare with the as-sintered t-phase materials, unidirectional compression tests were conducted at 1400° C.

The compressive strength at 1400° C. of the 3 mol % yttria-doped t'-phase zirconia was about 220 MPa. The load deflection curve up to the maximum stress, at which the sample fractured in a brittle manner, was consistent with purely elastic behavior. A typical load deflection curve is shown in FIG. 8. The initial nonlinearity is due to sample slippage under the platens. Elastic behavior shows that the creep resistance must be quite high and results from the very large (about 120 μm) grain size which essentially eliminates diffusional creep.

On the other hand, the 3 mol % yttria-doped t-phase zirconia sample (sintered at 1450° C.) with a grains size of 0.6 μm deformed plastically at a stress level as low as 17 MPa at 1400° C. even though these materials were strong and tough at room temperature. A typical load deflection curve at 1400° C. is shown in FIG. 9. It is not surprising that the creep behaviors are different since the creep resistance increases with grain size. One 3 mol % yttria-doped tetragonal t-phase zirconia sample was subjected to a four point bending test at 1400° C. and this sample deformed at a stress level of 5 MPa without breaking. The grain boundary sliding mechanism has been used to explain the superplastic deformation behavior of tetragonal phase yttria-stabilized zirconia.

In contrast to the behavior of t-phase zirconias, the t'-phase zirconia containing submicron ferroelastic domains within its large grains did not suffer from the same high creep rate. In addition to their creep resistance, these materials (despite a large grain size) exhibit a moderately high strength. The toughness of these materials is comparable to the regular t-phase materials despite the absence of transformation toughening.

Some 3 mol % yttria-doped t'-phase zirconia samples after annealing at 1600° C. were also tested at 1400° C. As indicated previously, the objective of thermal treatment at 1600° C. was to assess the possible effect of phase separation. The compressive strength after thermal treatment at 1600° C. was 360 MPa.

Figure 10:
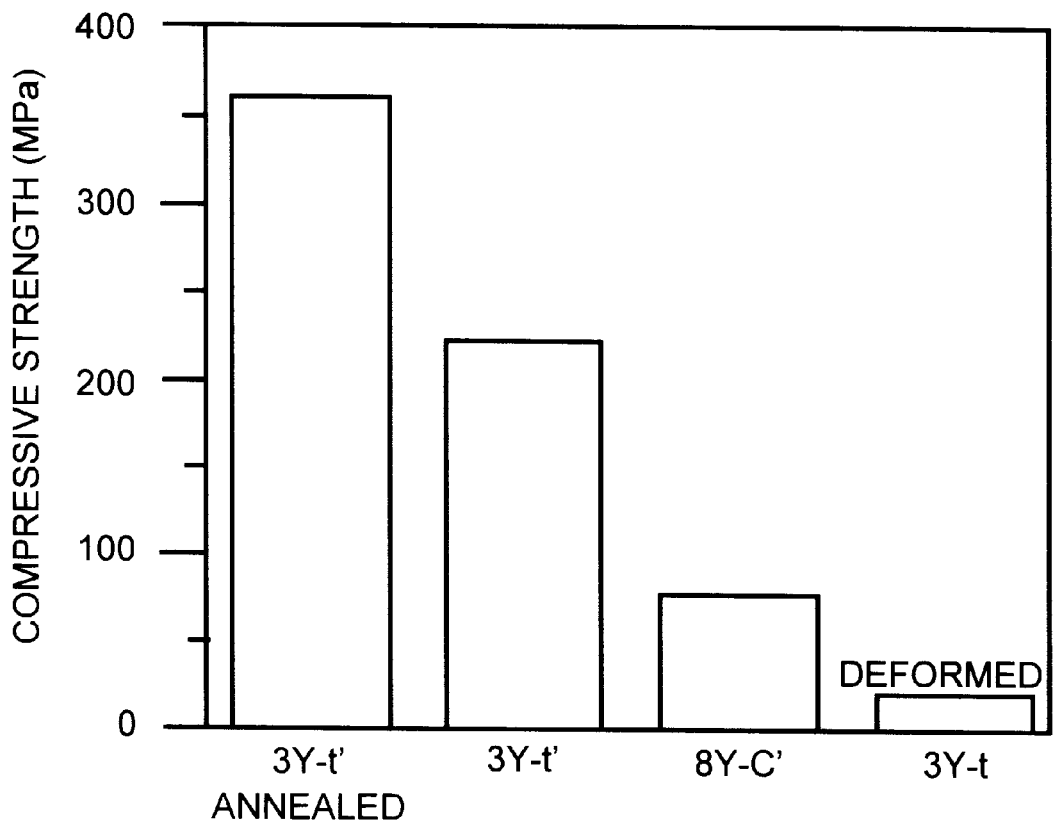
FIG. 10 is a bar graph showing the compressive strength at 1400° C. of annealed t'-, t-, and c-phase zirconias.

FIG. 10 shows that the compressive strength at 1400° C. of the annealed sample was 50% higher than the sample without annealing. In addition, this strength is 4 times higher than the 8 mol % yttria-stabilized cubic phase (baseline) zirconia. This result is consistent with the enhanced compressive strength reported for zirconia single crystals after 1600° C. annealing. The testing temperature (1400° C.) was well above the temperatures at which the transformation toughening mechanism is operative. Thus, this increase in mechanical strength should be explained by mechanisms other than transformation toughening. The prolonged holding of the yttria stabilized t'-phase zirconia materials at 1600° C. thus is not expected to degrade their mechanical properties. On the contrary, an enhancement is observed after 50 hours of annealing. By contrast, 3 mol % yttria-doped, as-sintered (at 1450° C.) tetragonal t-phase zirconia without a high temperature treatment cracked after 1600° C. annealing due to phase destabilization.

The compressive strength of 8 mol % yttria-doped cubic phase zirconia heat-treated at 2000° C. (grain size about 100 μm) was 77 MPa at 1400° C. while that of the as sintered cubic phase with a grain size of about 5 μm was 189 MPa. This indicates that for cubic phase zirconia, the mechanical strength is a function of grain size. No superplastic deformation was observed in cubic phase materials since the grain size is substantially greater than that of t-phase materials. Improved mechanical strength may be possible if the grain size can be kept small. But this approach is not feasible because significant grain growth will occur in cubic phase materials when used at temperature higher than 1400° C. The high temperature deformation data of the yttria-doped zirconias with different heat treatments are summarized in the bar graph given in FIG. 10.

Some of the as-sintered zirconia samples were also tested at smaller loads. Some 3 and 8 mol % $Y_2O_3$-doped rods (both before and after high temperature treatment) were loaded with zirconia blocks (1.0 pound) as dead weights and heated to a temperature of 1600° C. for 2 hours. This demonstrated the deformation behavior of zirconia materials at low flow stresses and high temperatures. The stress levels and results of the individual tests are summarized in Table I.

TABLE I

Creep Data of Various Zirconias at 1600° C.

| Sample | Treatment | Stress | Note |
|---|---|---|---|
| 3 mol % yttria doped zirconia (t'-phase) | Sintered at 1450° C./ 4 hr. Heat treated at 2100° C. | 0.27 MPa | No Change |
| 3 mol % yttria doped zirconia (t-phase) | Sintered at 1450° C./ 4 hr | 0.33 MPa | Superplastically deformed |
| 8 mol % yttria doped zirconia (cubic phase) | Sintered at 1450° C./ 4 hr. Heat treated at 2100° C. | 0.33 MPa | No Change |
| 8 mol % yttria doped zirconia (cubic-phase) | Sintered at 1450° C./ 4 hr, (small grains) | 0.31 MPa | No Change |

As expected, the 3 mol % yttria-stabilized tetragonal phase (t) zirconia deformed at a very low stress level (0.33 MPa) while the other materials had better resistance to creep deformation at high temperatures due to their larger grain sizes. Significant grain growth was also observed in the 3 mol % yttria-stabilized tetragonal phase zirconia sample in which the grain size of the tetragonal phase increased from submicron before the creep test to 1.5 μm after the test.

3. Formation of t'-Phase Zirconia by Direct Resistive Heating

Figure 11:
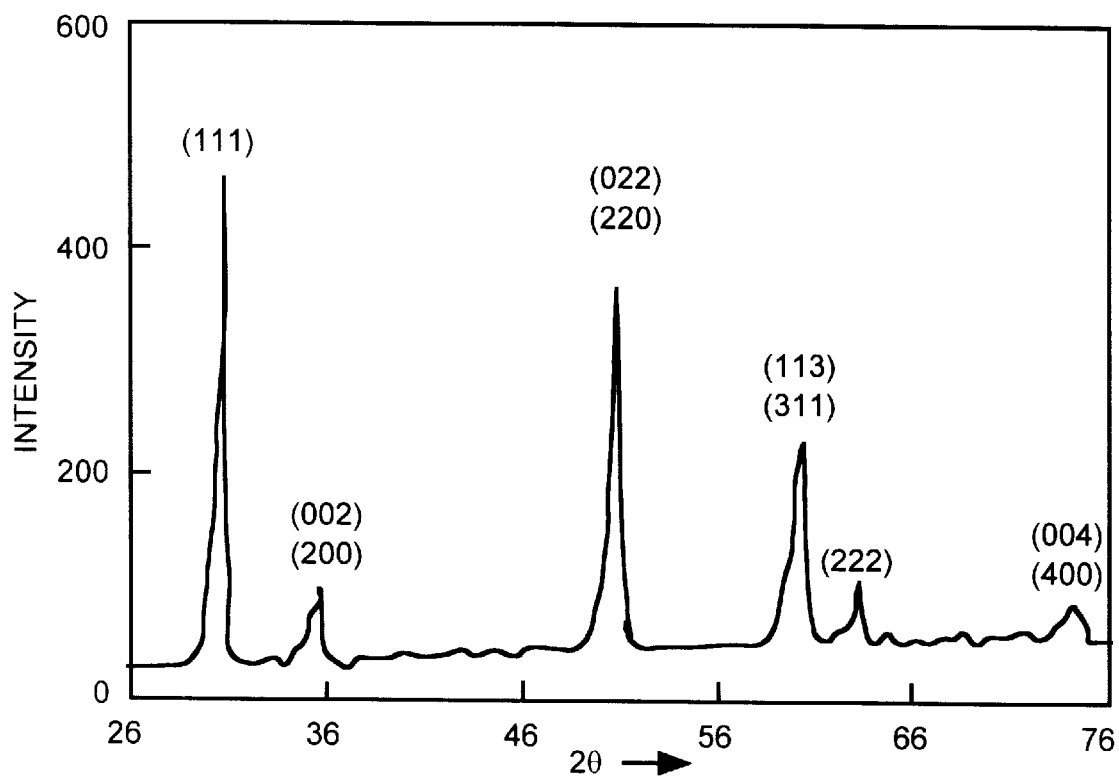
FIG. 11 is an x-ray diffraction (XRD) pattern of a 4.5 mol % yttria-doped zirconia from a commercially available zirconia tube before resistive heating.

During resistive heating, if the temperature exceeds that corresponding to the cubic phase field, it is expected that upon cooling t'-phase would form. In order to determine if the ti-phase forms by resistive heating, some of the 4.5 mol % yttria-stabilized zirconia tubes from a commercial vendor were coated with a platinum paste on both ends. To ensure a good contact between the platinum electrode and the zirconia tube, the assembly was fired at 1000° C. for 1 hour. The zirconia tubes contained no monoclinic phase before firing as seen in the XRD pattern shown in FIG. 11. The grain size of tubes obtained from the commercial vendor was relatively large (about 30 μm), a result of the high sintering temperature (1720° C.) and long sintering time (72 hours).

FIG. 12 shows an optical micrograph of the zirconia tube from the commercial vendor before resistive heating.

Figure 14:
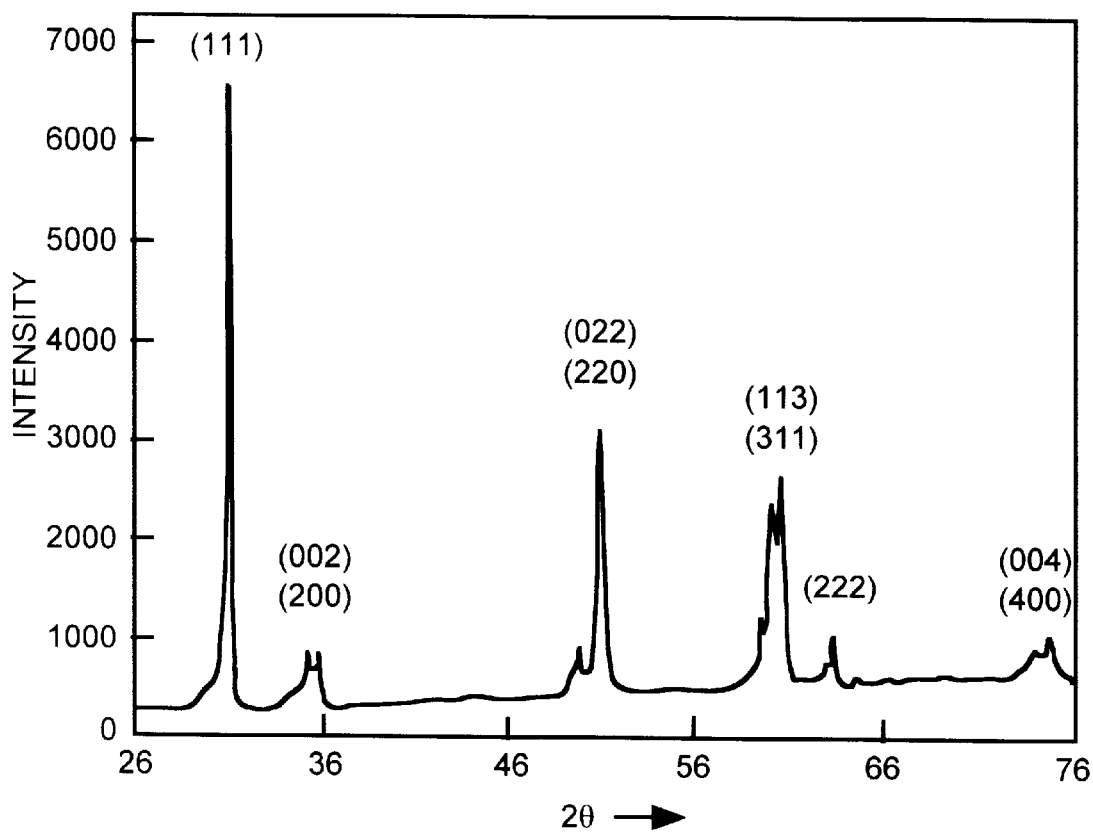
FIG. 14 is an XRD pattern of zirconia from a tube as in FIG. 11 after direct resistive heating to form t'-phase.
Figure 15:
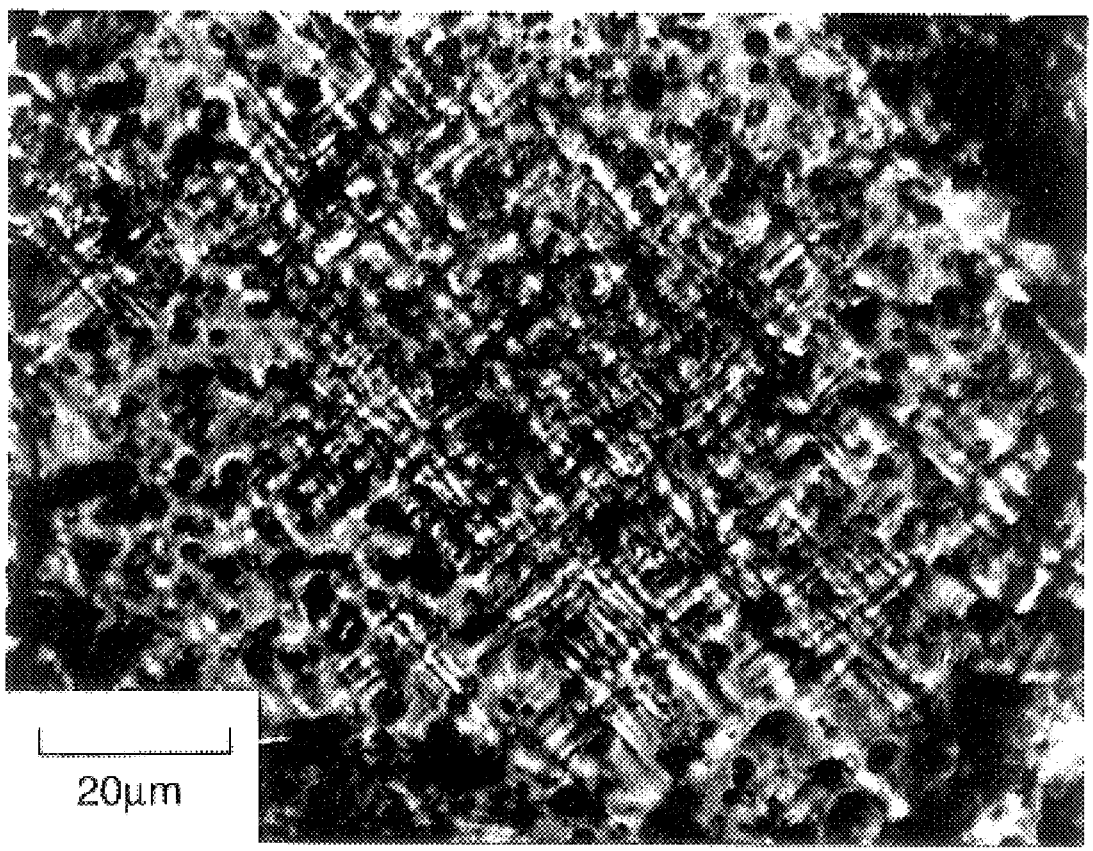
FIG. 15 is a transmission optical microscopy image using cross-polarized light.

After heating to 1450° C. by molybdenum disilicide heating elements, the element was heated by resistive heating. The maximum voltage applied was 200 volts and the maximum current passed through the element was 7 amperes for a total power input of 1.4 kW. The zirconia tube was heated to 1920° C. by direct resistive heating in 15 minutes. This was the outer surface temperature as measured by an optical pyrometer. The interior surface temperature is clearly expected to be higher. Further, it is expected that the temperature that can be achieved will be considerably higher with a set of six or eight elements. The tube was then cooled down to 1450° C. in 10 minutes followed by furnace-cooling to room temperature. The tube after treatment was examined using XRD and SEM. FIG. 13 shows that the grain size of the interior portions of this zirconia tube increased to more than about 50 μm after the resistive heating. The grain size of the surface of the same zirconia tube remained at about 30 μm. XRD trace given in FIG. 14 also shows that no monoclinic phase formed upon cool down after the high temperature treatment. Thin samples were polished and examined under TOM using cross polarized light. FIG. 15 shows the ferroelastic domains, a clear evidence of the formation of the t'-phase in 4.5 mol % $Y_2O_3$-doped zirconia by direct resistive heating.

4. Application of t'-Phase Zirconia as Heating Elements

Figure 16A:
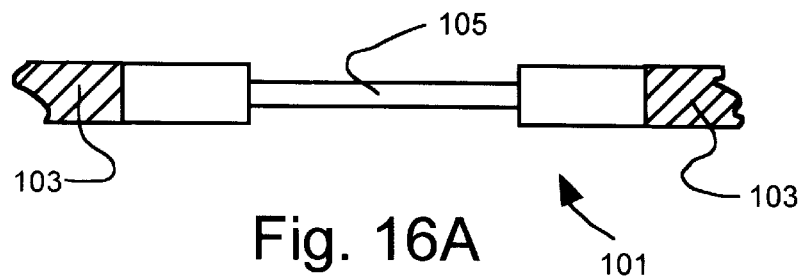
FIGS. 16A, 16B, and 16C are schematics of heating elements manufactured according to the invention.
Figure 16B:
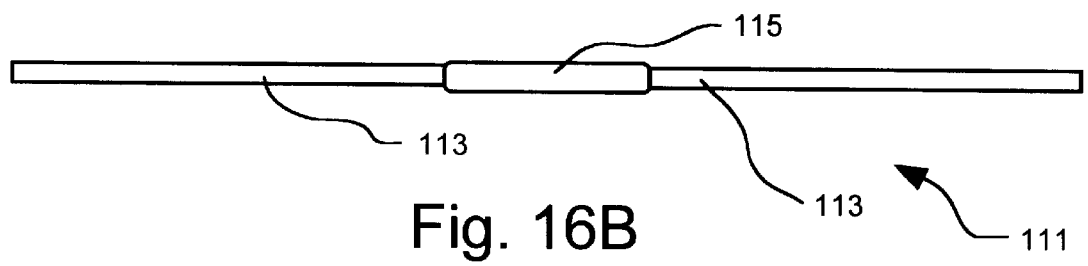
Figure 16C:
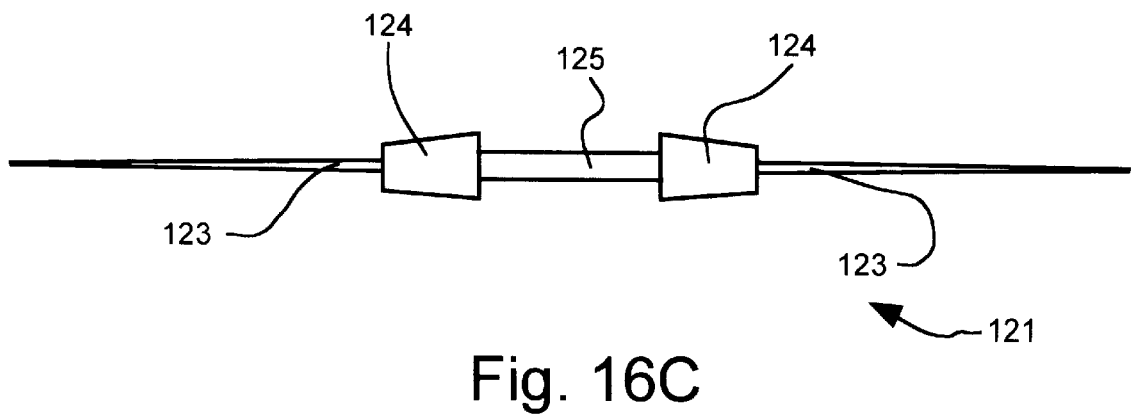

Zirconia is already being used as a material for heating element application. However, it is the cubic phase that has been used, which for reasons mentioned earlier does not exhibit satisfactory properties. It is expected that immediate application of t'-phase zirconia thus would be in high temperatures heating elements. The current commercial heating elements are supplied by China using CaO-stabilized cubic phase zirconia and LSC electrodes. In order to justify the feasibility of using yttria-stabilized zirconia as a heating element, three different kind of elements were assembled. FIGS. 16A and 16B show two kinds of elements. FIG. 16A shows an element 101 using LSC electrodes 103, and a yttria-stabilized zirconia tube 105. The tube 105 was about 4.5 inches (11 cm) long. FIG. 16B shows an element 111 with a yttria-stabilized zirconia bar in the form of a tube 115 with platinum electrodes 113 at each end. The zirconia tube 115 was about 3 inches (7 cm) long. In both of these two elements, 4.5 mol % yttria-stabilized zirconia tubes were used. FIG. 16C shows an element 121 comprising a t'-phase zirconia phase mounted between end tubes 124 made by sintering a zirconia castable. Other oxide conductors would also be suitable. Platinum electrodes 123 were then cemented to the end tubes 124. The zirconia tube was about 4 inches (10 cm) long.

Figure 17:
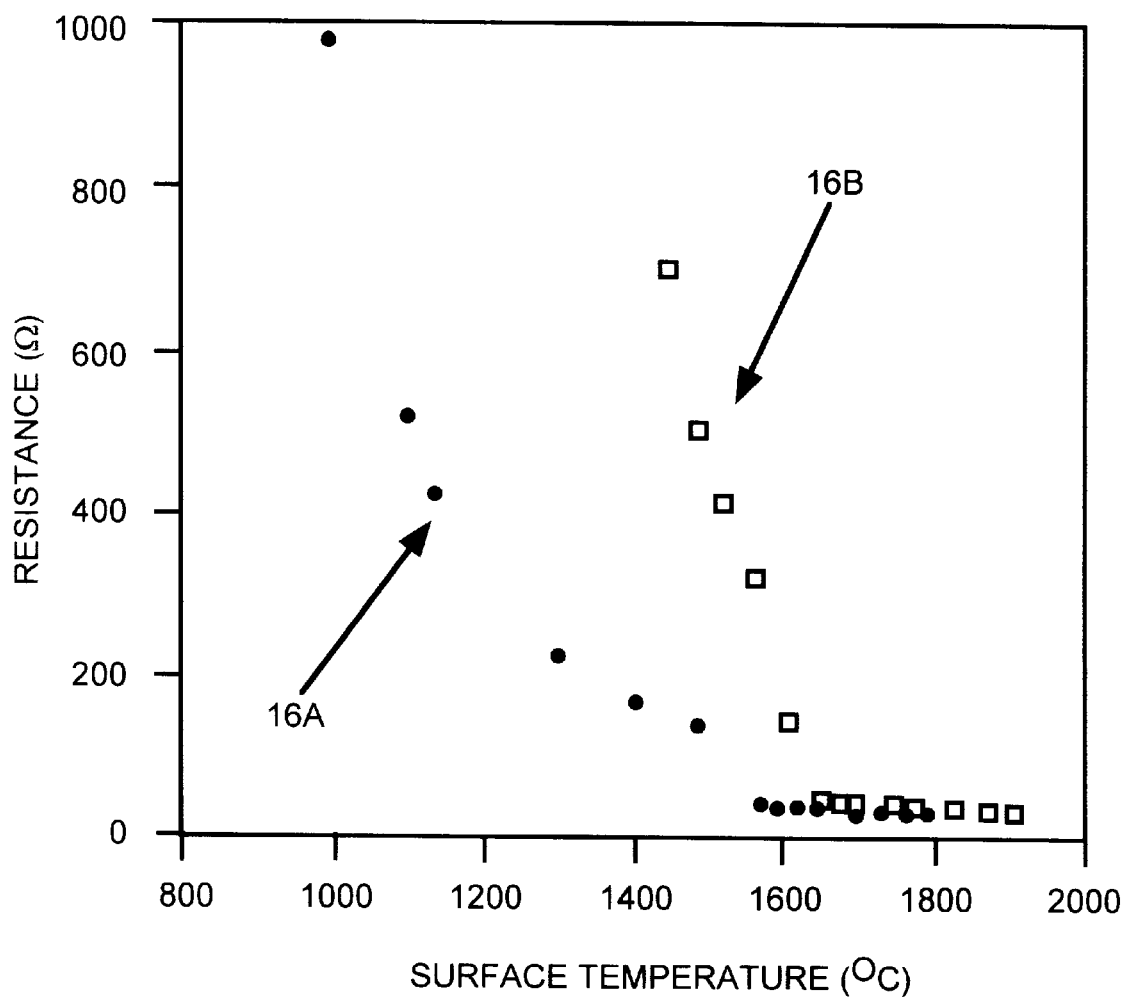
FIG. 17 is a graph of resistance vs. surface temperature for heating elements constructed according to 16A and 16B.

The electrical heating of elements constructed as in FIGS. 16A and 16B was conducted beginning at 1450° C. FIG. 17 shows a plot of resistance vs. temperature for these two different elements. The heating length was 7.5 cm and the cross-section of the tubes was 0.65 cm². At temperatures higher than 1700° C., both elements exhibited similar resistance regardless of the electrode used.

Figure 18:
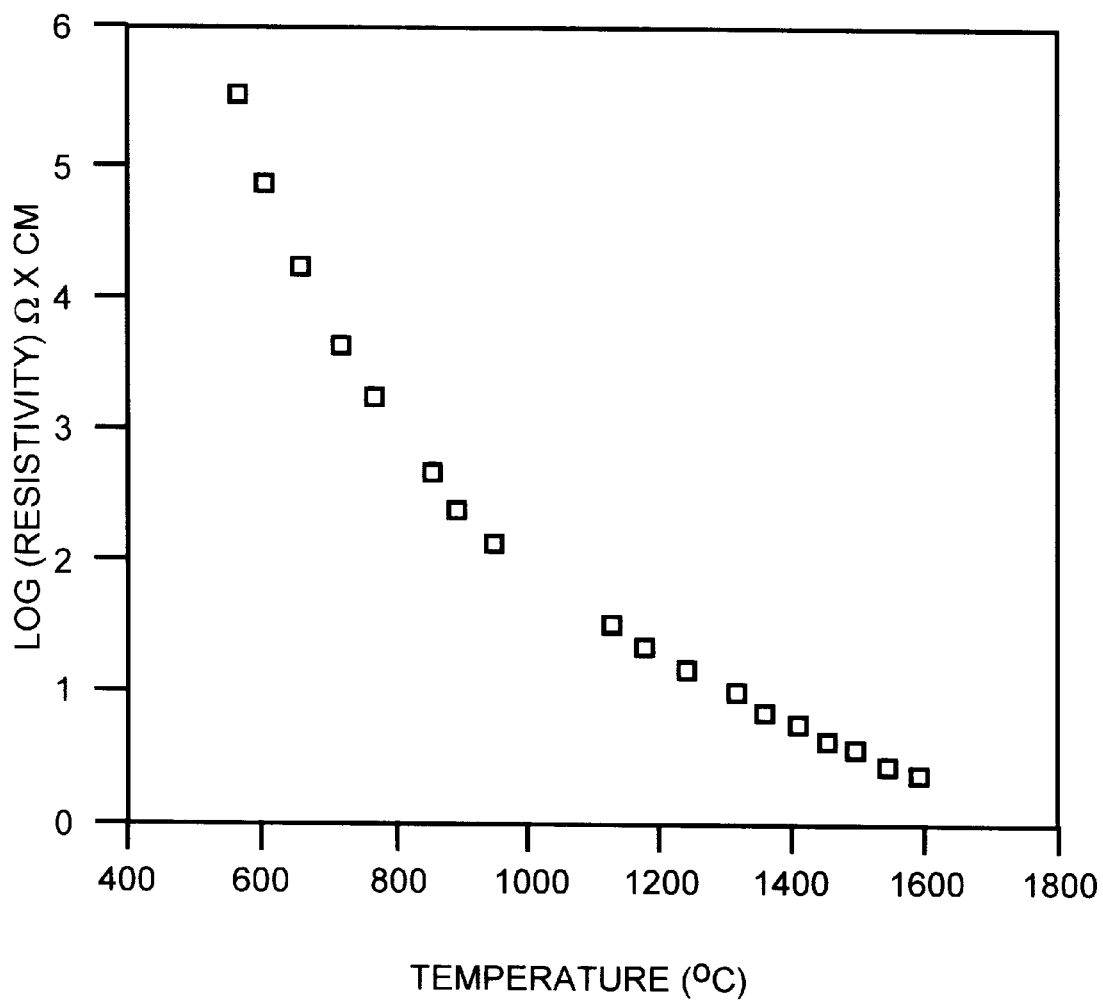
FIG. 18 is a graph of resistance vs. surface temperature for a heating element constructed according to 16C.

FIG. 18 shows the resistivity vs. temperature of an element constructed according to FIG. 16C using a zirconia tube 125 of 4.5 mol % yttria stabilized zirconia. The resistivity of this element is similar to the commercially available zirconia element. The maximum power dissipated through the element was 1.4 kW, enough to increase the surface temperature of the element 350° C. higher than the furnace temperature. There was only one heating element in the test stand. As such, radiative loss from one element precludes attaining a higher temperature. Temperature in excess of 2000° C. is expected with six, or even four, heating elements.

One main limitation for current commercial CaO-stabilized cubic zirconia heating elements is their low thermal shock resistance. This is the reason why the recommended heating and cooling rates of the commercial elements are unacceptably low (15°/hour). This limitation increases the power consumption due to long heating and cooling cycles. It also increases the cycle time and decreases the reliability of the elements in the case of power failure. Yttria-stabilized t'-phase zirconia has a much better thermal shock resistance. In order to verify this, a 4.5 mol % yttria-stabilized zirconia tube and CaO-stabilized zirconia tube were heated to 1900° C., followed by rapid cooling (1500° C./hour) to 1400° C. and then cooled to room temperature at a cooling rate of 400° C./hour. The CaO-stabilized zirconia tube cracked while no cracks were observed on the yttria-stabilized t'-phase zirconia tube. The yttria-stabilized t'-phase zirconia tube was machined into 1.5 mm×2.5 mm×50 mm bar shaped samples. Room temperature bending strength was measured to be about 220 MPa. This strength is lower than reported strengths for fully dense t'-phase zirconia. But considering the lower density of the tubes from the commercial vendor, it is a reasonable number.

Figure 19:
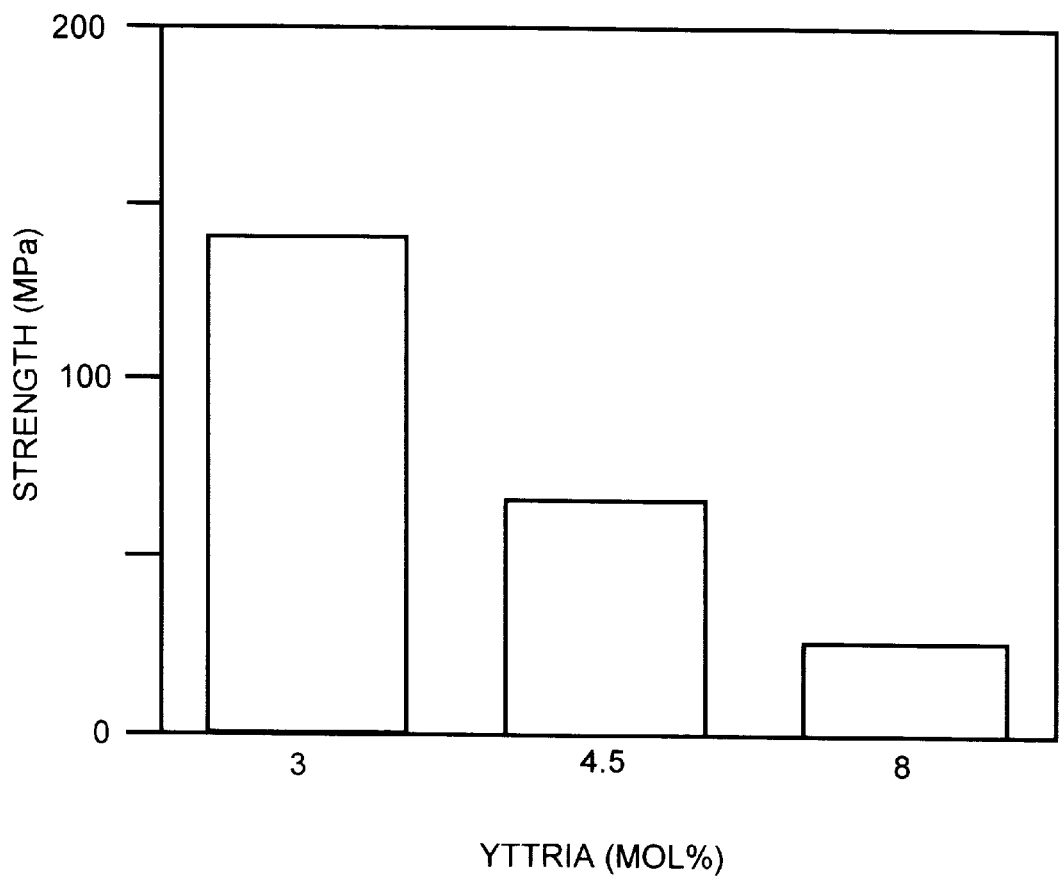
FIG. 19 is a graph of strength vs. yttria content.

Since thermal shock resistance and phase stability are the main issues for the zirconia used in heating element application, a preliminary study on thermal shock was initiated. The thermal shock resistance was determined on 3, 4.5 and 8 mol % yttria-stabilized zirconia after high temperature (2000° C.) treatment. The samples were air quenched from 1400° C. and their retained strength in bending was measured. The average retained flexural strength for each composition is shown in FIG. 19. These results show that the thermal shock resistance of 3 mol % yttria-stabilized zirconias is the highest. The 8 mol % yttria-stabilized zirconia exhibits good phase stability but low mechanical strength making it less attractive. The retained bending strength of the 4.5 mol % yttria-stabilized zirconia after thermal shock is twice that of 8 mol % yttria-stabilized zirconia and phase stability is not a problem. The 4.5 mol % yttria-stabilized t'-phase zirconia provides both satisfactory phase stability and thermal shock resistance and therefore is ideally suited for high temperature heating element applications.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A ceramic body of a complex shape consisting essentially of t'-phase zirconia and a rare-earth oxide having a major portion of the t'-phase zirconia with grain size between 50 and 100 $\mu$m, and not greater than 0.1 $\mu$m variant domain size.

2. A ceramic body as in claim 1 wherein the rare-earth oxide is from the group consisting of yttria, scandia, erbia, and ceria.

3. A ceramic body as in claim 1 wherein the rare-earth oxide is yttria present in an amount between 2.5 and 5 mole percent and the ceramic body has toughness greater than about 8 MPa$\sqrt{}$m.

4. A ceramic body as in claim 1 wherein the complex shape is a cored brick for storage heater applications.

5. A heating element comprising a bar with a first and second end consisting essentially of t'-phase zirconia doped with a rare-earth oxide having a major portion of the t'-phase zirconia with grain size between 50 and 100 $\mu$m, and not greater than 0.1 $\mu$m variant domain size, and first and second electrodes attached to the first and second ends, respectively, such that an electrical current can pass between the electrodes through the bar.

6. A heating element as in claim 5 wherein the rare-earth oxide is from the group consisting of yttria, scandia, erbia, and ceria.

7. A heating element as in claim 5 wherein the rare-earth oxide is yttria present in an amount between 2.5 and 5 mole percent.

* * * * *